United States Patent
Hanks et al.

(10) Patent No.: US 8,945,321 B2
(45) Date of Patent: Feb. 3, 2015

(54) METHOD AND APPARATUS FOR REWORKING STRUCTURES USING RESIN INFUSION OF FIBER PREFORMS

(75) Inventors: Dennis James Hanks, Enumclaw, WA (US); Jack Allen Woods, Kent, WA (US); Gregory Robert Gleason, Seattle, WA (US)

(73) Assignee: The Boeing Company, Chicago, IL (US)

( * ) Notice: Subject to any disclaimer, the term of this patent is extended or adjusted under 35 U.S.C. 154(b) by 618 days.

(21) Appl. No.: 13/118,546

(22) Filed: May 30, 2011

(65) Prior Publication Data

US 2012/0305169 A1     Dec. 6, 2012

(51) Int. Cl.
| | | |
|---|---|---|
| *B29C 73/00* | (2006.01) | |
| *B32B 43/00* | (2006.01) | |
| *B29C 65/00* | (2006.01) | |
| *B32B 37/00* | (2006.01) | |
| *B29C 70/44* | (2006.01) | |
| *B29C 73/10* | (2006.01) | |

(Continued)

(52) U.S. Cl.
CPC .............. *B29C 70/443* (2013.01); *B29C 73/10* (2013.01); *B29C 73/12* (2013.01); *B29C 2073/264* (2013.01)
USPC .............. 156/98; 156/285; 156/286; 156/382

(58) Field of Classification Search
CPC ...... B29C 65/00; B29C 65/48; B29C 65/483; B29C 65/42; B29C 65/54; B29C 65/542; B29C 65/546; B29C 66/001; B29C 66/00145; B32B 3/00; B32B 3/20; B32B 3/26; B32B 3/266; B32B 43/00; B32B 37/10; B32B 37/1009; B32B 37/1018; B32B 9/045; B32B 27/04; B32B 27/12; B32B 38/1858
USPC ............ 156/285, 286, 382; 264/87, 511, 526, 264/553, 566, 568, 571, 101, 102; 425/504, 425/405.1, 405.2, 546, 388
See application file for complete search history.

(56) References Cited

U.S. PATENT DOCUMENTS 5,271,145 A * 12/1993 Westerman et al. ............ 29/558
6,041,840 A *  3/2000 Ogawa ......................... 156/382

(Continued)

FOREIGN PATENT DOCUMENTS

| CA | 2790995 A1 | 9/2011 |
|---|---|---|
| DE | 4019744 A1 | 1/1992 |

(Continued)

OTHER PUBLICATIONS

Hautier et al., "Investigation of Composite Repair Method by Liquid Resin Infusion," Plastics, Rubber, and Composites, vol. 39, Nos. 3-5, Jun. 2010, pp. 200-207.

(Continued)

*Primary Examiner* — Richard Crispino
*Assistant Examiner* — Matthew Hoover
(74) *Attorney, Agent, or Firm* — Yee & Associates, P.C.

(57) ABSTRACT

An area of a structure is reworked using resin infusion of a fiber preform. A resin flow hole is formed through the structure from a first side of the structure to a second side of the structure. The fiber preform is placed on the first side of the structure and substantially saturated with resin by flowing resin into the preform and out through the resin flow hole to the second side of the structure.

19 Claims, 8 Drawing Sheets

(51) Int. Cl.
*B29C 73/12* (2006.01)
*B29C 73/26* (2006.01)

(56) References Cited

U.S. PATENT DOCUMENTS

| | | | |
|---|---|---|---|
| 6,206,067 B1* | 3/2001 | Kociemba et al. | 156/382 |
| 7,138,028 B2 | 11/2006 | Burpo et al. | |
| 7,300,894 B2* | 11/2007 | Goodell et al. | 442/242 |
| 7,334,782 B2 | 2/2008 | Woods et al. | |
| 7,413,694 B2 | 8/2008 | Waldrop, III et al. | |
| 2002/0022422 A1* | 2/2002 | Waldrop et al. | 442/179 |
| 2003/0019567 A1 | 1/2003 | Burpo et al. | |
| 2004/0256053 A1* | 12/2004 | Burpo et al. | 156/285 |
| 2005/0073076 A1 | 4/2005 | Woods et al. | |
| 2008/0136060 A1 | 6/2008 | Shpik et al. | |
| 2008/0220112 A1 | 9/2008 | Waldrop et al. | |
| 2009/0309260 A1 | 12/2009 | Keuchel | |

FOREIGN PATENT DOCUMENTS

| | | |
|---|---|---|
| FR | 2777496 A1 | 10/1999 |
| GB | 2316036 A | 2/1998 |

OTHER PUBLICATIONS

Karbhari et al., "Strengthening of Concrete Column Stubs Through Resin Infused Composite Wraps," Journal of Thermoplastic Composite Materials, vol. 6, No. 2, Apr. 1993, pp. 92-107.

Sterkenburg et al., "A Titanium and Carbon Fiber Hybrid Repair Patch Using Vacuum Assisted Resin Transfer Molding," Proceedings of the 2010 SAMPE Technical Conference, May 2010, 6 pages.

Tzetzis et al., "Bondline Toughening of Vacuum Infused Composite Repairs," Composites Part A, vol. 37, No. 9, Sep. 2006, pp. 1239-1251.

EP search report dated Sep. 28, 2012 regarding application 12165427.1-2307, reference 1284P420EPML, applicant The Boeing Company.

Campbell, "Liquid molding: You get a good preform and tool . . . you get a good part," Chapter 3, Manufacturing Processes for Advanced Composites, Jan. 2004, pp. 304-356.

Hoebergen et al., "Vacuum Infusion," ASM Handbook, vol. 21—Composites, Miracle & Donaldson ed., Dec. 2001, pp. 501-511.

"A Titanium and Carbon Fiber Hybrid Repair Patch Using Vacuum Assisted Resin Transfer Molding": Purdue University; D. Tzetzis, Sep. 24, 2012.

"Investigation of composite repair method by liquid resin infiltration"; *Plastics, Rubber and Composites*, vol. 39, Nos. 3-5, Jun. 2010, pp. 200-207(8); Hautier, M; Lévêque, D.; Huchette, C.; Olivier, P.

"Strengthening of Concrete Column Stubs through Resin Infused Composite Wraps"; *Journal of Thermoplastic Composite Materials*; Apr. 1993 6: pp. 92-107.

Canadian Intellectual Property Office Office Action, dated Mar. 6, 2014, regarding Application No. 2,772,345, 2 pages.

* cited by examiner

METHOD AND APPARATUS FOR REWORKING STRUCTURES USING RESIN INFUSION OF FIBER PREFORMS

TECHNICAL FIELD

This disclosure generally relates to techniques for reworking structures, especially composites, and deals more particularly with a method and apparatus for reworking areas of structures using resin infusion of fiber preforms.

BACKGROUND

Composite structures sometimes have localized areas containing one or more inconsistencies that may require rework in order to bring the structure within design tolerances. One technique for reworking localized areas of structures involve placing a patch over the area and securing it to the parent structure using mechanical fasteners, however fasteners may increase aircraft weight and/or drag on the aircraft, and may be esthetically undesirable in some applications. Another rework technique involves bonding the rework patch to the parent structure however this technique may also require the use of mechanical fasteners to provide secondary load paths forming an arrestment mechanism to limit the growth of an inconsistency. Still another technique for reworking structures, referred to as a wet layup technique, involves hand layup of wet plies with fiber reinforcement, such as a woven or knitted fabric and applying wet resin to the plies as they are laid up. The wet layup technique may result in air entrapment within the patch which may result in porosities in the reworked area. The wet layup technique may also be labor intensive, requires repair technicians to come into proximity with wet resin and may require excessive cleanup activity.

Accordingly, there is a need for a method and apparatus for reworking structures, especially composites, that result in a high quality rework meeting desired performance standards which reduces or eliminates porosities due to air entrapment. There is also a need for a repair method which may reduce labor.

SUMMARY

The disclosed embodiments provide a method and apparatus for reworking a localized area of a structure, especially composite structures, that reduce or eliminate porosities in the rework area due to air entrapment during the rework process. Air entrapment may be substantially eliminated by using a multi-ply fiber preform rework patch that is infused with resin after placement on the parent structure. The fiber preform is more fully saturated with resin during the infusion process by flowing resin into the fiber preform and away from the repair area through a resin flow through hole formed the parent structure. By flowing resin through the fiber preform and allowing excess resin to escape through the flow hole, air entrapment that may lead to porosities is substantially eliminated.

According to one disclosed embodiment, a method is provided of reworking an area of a structure having first and second sides. The method comprises forming a resin flow hole through the structure in the rework area from the first side of the structure to the second side of the structure. The method also includes placing a fiber preform on the first side of the structure, impregnating the preform with resin and controlling the resin wavefront by flowing resin through the preform and into the resin flow hole. The method may further comprise forming a depression in the structure within the rework area by removing undesirable material from the first side of the structure to accommodate the fiber preform. The method may further comprise placing a vacuum bag over the fiber preform and sealing it into the first side of the structure around the preform, flowing resin into the preform and drawing a vacuum on the bag to apply compaction pressure to the preform in order to drive resin through the preform and into the resin flow hole to the second side of the structure.

According to another disclosed embodiment, a method is provided of reworking an area of the composite structure. An area of a first side of the structure is scarfed, and a hole is formed in the structure within the scarfed area. A fiber preform is placed in the scarfed area overlying the hole, and the preform is impregnated with resin by flowing resin into the fiber preform. The fiber preform is compacted and some of the resin flowing into the fiber preform is allowed to escape the scarfed area by flowing through the hole. The method further comprises coupling the hole with an excess resin reservoir where excess resin flowing through the hole may accumulate. The method may also include reducing the pressure within the excess resin reservoir to a value that is less than atmospheric pressure. Compaction of the fiber preform may be carried out by vacuum bag compaction.

According to still another embodiment, a method is provided of reworking an area of an aircraft skin. The outer side of the skin is prepared within the rework area to receive a fiber preform. A hole is formed in the skin that passes from the outer side to the inner side of the skin within the rework area. The fiber preform is placed on the prepared outer side of the skin and is infused with resin by introducing resin into the fiber preform from the outer side of the skin and flowing resin through the hole to the inner side of the skin. The fiber preform is compacted during the resin infusion process. Preparing the outer side of the skin may include scarfing a portion of the skin to substantially match a profile of the fiber preform.

According to another embodiment, vacuum assisted resin infusion apparatus is provided for reworking an area of a structure having first and second sides. The apparatus comprises a source of resin, a fiber preform adapted to be placed within an opening through the structure in the area being reworked and a vacuum bag coupled with the resin source and adapted to be sealed to the first side of the structure covering the fiber preform. A vacuum source is coupled with the bag for drawing a vacuum in the bag. A backing plate is provided that bears against the second side of the structure and covers the opening in the structure. The backing plate includes a resin flow through hole therein that allows resin flowing into the fiber preform to exit the preform through the second side of the structure.

BRIEF DESCRIPTION OF THE ILLUSTRATIONS

DETAILED DESCRIPTION

Figure 1:
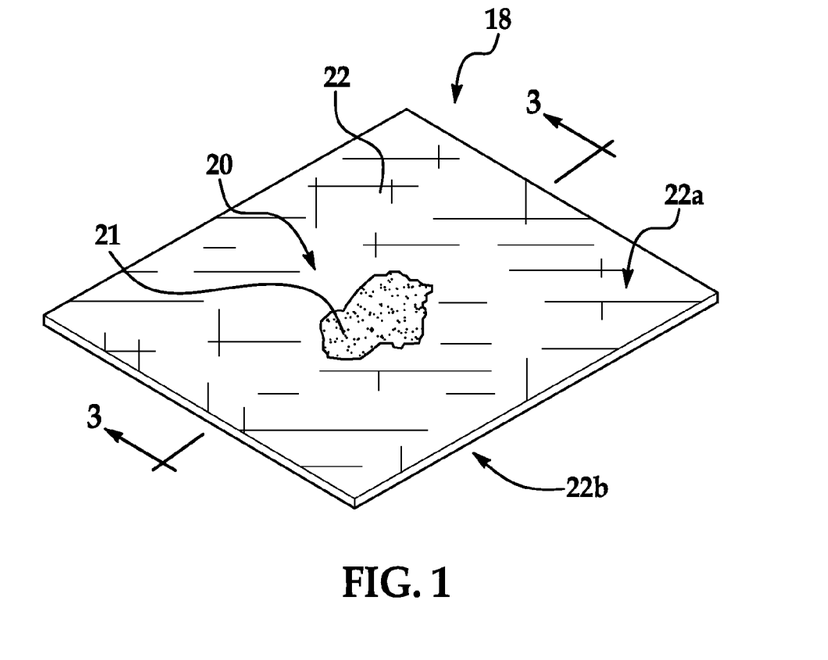
FIG. 1 is an illustration of a perspective view of a structure having an inconsistency requiring rework.
Figure 2:
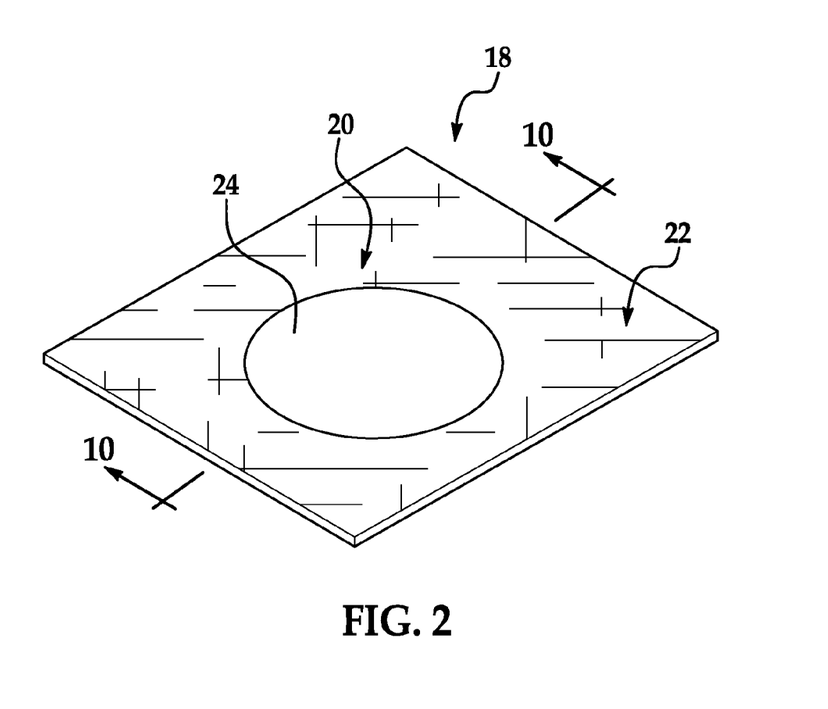
FIG. 2 is an illustration similar to FIG. 1 but showing the structure having been reworked using a resin infused fiber patch according to the disclosed method.
Figure 3:
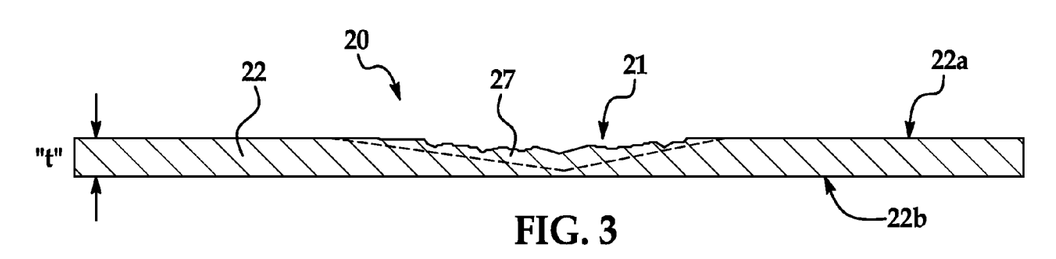
FIG. 3 is an illustration of a sectional view taken along the line 3-3 in FIG. 1.
Figure 8:
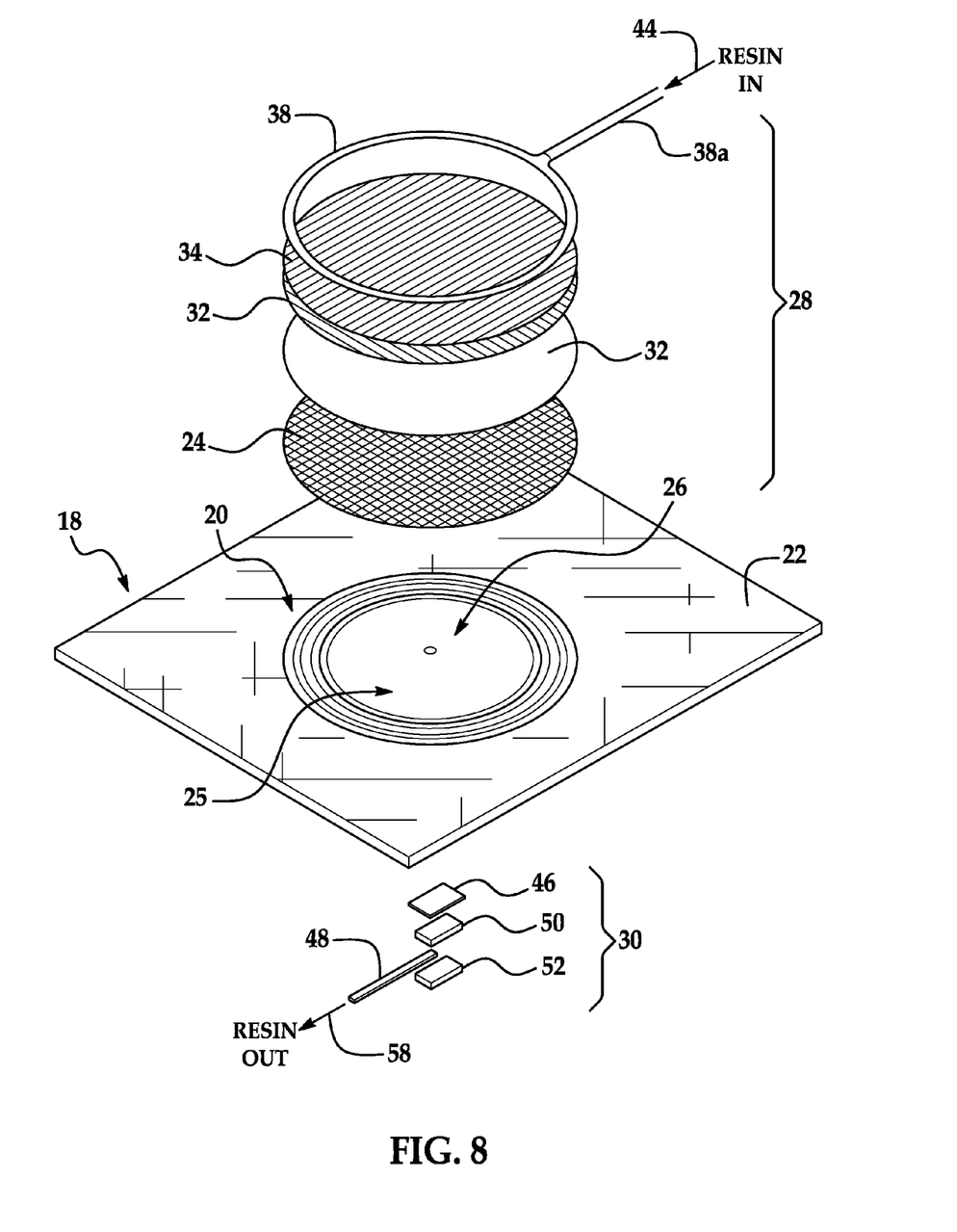
FIG. 8 is an illustration of an exploded, perspective view of the components shown in FIG. 7 for a typical rework application, installed vacuum bags not shown for clarity.

Referring first to FIGS. 1 and 3, a composite structure 18 may have a localized area 20 containing one or more inconsistencies 21 that requires rework in order to bring the structure 18 within design or performance tolerances and/or specifications. In the illustrated example, the structure 18 comprises a composite aircraft skin 22 having a thickness "t", with an outer first side 22a and an inner second side 22b. The structure 18 may comprise other shapes and materials, including, without limitation, ceramics, metals and metal composites. The inconsistencies 21 may comprise, for example and without limitation, impact damage, cracks, fractures, or porosities occurring at the time of manufacture or while the structure is in service. The inconsistency 21 may partially or fully penetrate the thickness "t" of the skin. Referring also to FIGS. 2 and 8, in accordance with the disclosed embodiments, a method is provided of reworking the area 20 to bring it into design or performance specifications, using a rework patch 24, sometimes also referred to herein as a "fiber preform", before being infused with resin and cured.

Figure 4:
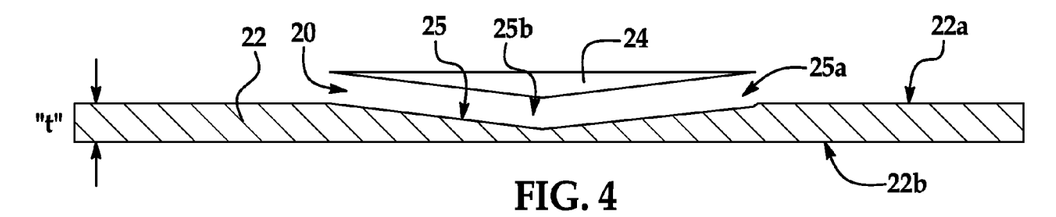
FIG. 4 is an illustration similar to FIG. 3 but showing the rework area having been scarfed.

Referring now to FIG. 3, according to the disclosed method, rework of the localized area 20 begins with removing a portion 27 of the skin 22 which includes the inconsistency 21. The process of removing a portion 27 of the skin 22, sometimes also referred to as "scarfing", results in a depression or scarfed area 25 in the skin 22, as shown in FIG. 4. In the illustrated example, the scarfed area 25 is shown as having a cross sectional profile that is substantially continuously tapered, from the outer edges 25a to the center 25b of the scarfed area 25. However, the scarfed area 25 may have other cross sectional profiles, including a stepped scarf (not shown). In a process step discussed later, a rework patch 24 is used to substantially fill the scarfed area 25.

Figure 5:
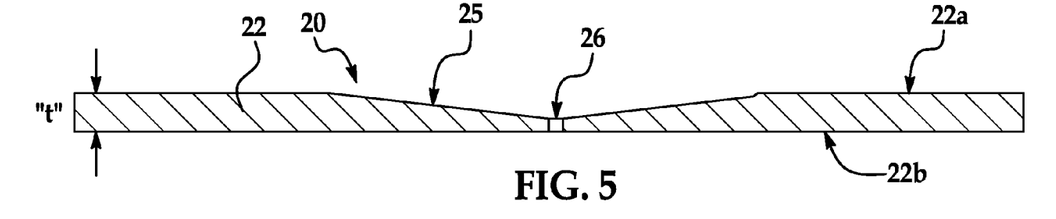
FIG. 5 is an illustration similar to FIG. 4 but showing a hole having been formed through the structure within the scarfed area.

Referring to FIG. 5, after the scarfed area 25 has been formed in the outer side 22a of the skin 22, a resin flow through hole 26 is formed in the skin 22, within the scarfed area 25, passing from the outer side 22a of the skin through the skin 22 to the skin's inner side 22b. The hole 26 may be formed by drilling or other suitable methods. In the illustrated example, the through hole 26 is located generally in the center 25b of the scarfed area 25, however other locations within the scarfed area 25 are possible, depending on the application. Also, while a single through hole 26 is shown in the illustrated embodiment, more than one through hole 26 may be employed at multiple locations within the scarfed area 25, depending upon the size and shape of the scarfed area 25.

Figure 6:
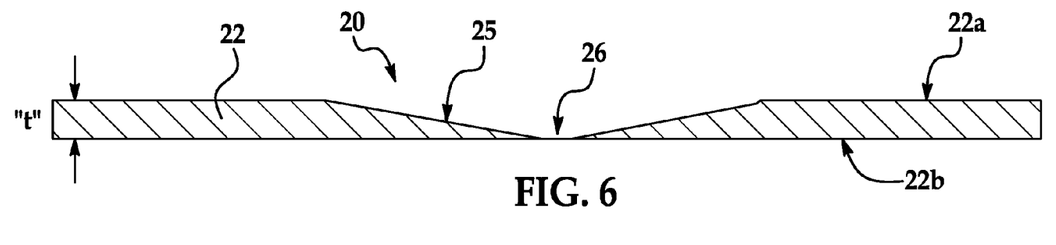
FIG. 6 is an illustration similar to FIG. 4 but showing a scarfed area that penetrates the inner side of the structure.

FIG. 6 illustrates an alternate technique for forming a resin flow through hole 26 through the skin 22 within the scarfed area 25. In this example, the material scarfing process is performed to a depth that penetrates the inner side 22b of the skin 22 so that the hole 26 is formed as part of the scarfing process. The size of the hole 26 and its location may depend upon the shape and angle of the scarf 25. This technique may be used when the inconsistency 21 is relatively deep and the portion 27 that needs to be removed approaches the thickness "t" of the skin 22.

Figure 7:
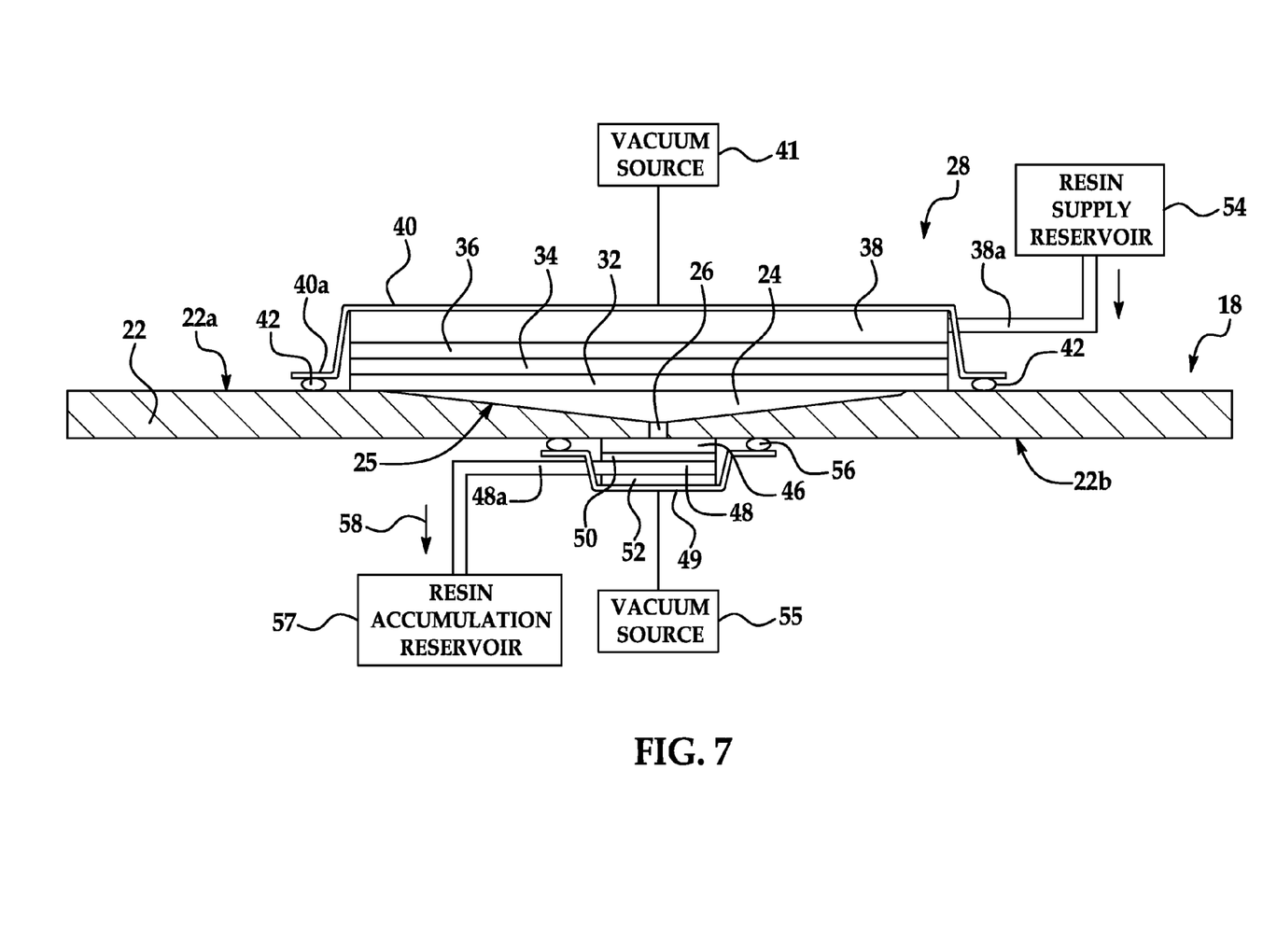
FIG. 7 is an illustration of a diagrammatic, cross sectional view of a fiber preform being infused with resin according to the disclosed method.
Figure 9:
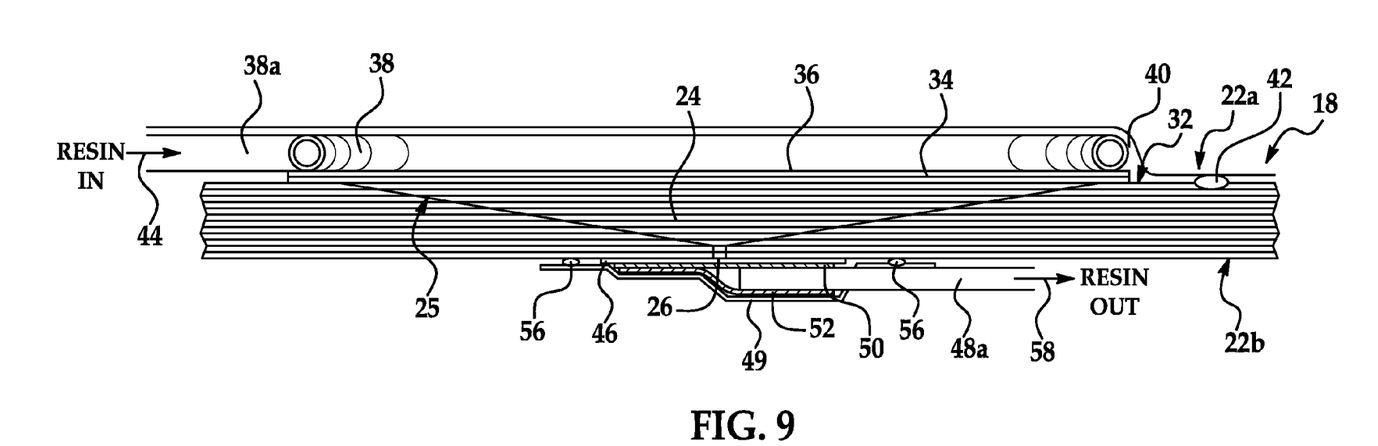
FIG. 9 is an illustration of a cross sectional view similar to FIG. 7, showing additional details of the components shown in FIG. 8.

Attention is now directed to FIGS. 7, 8 and 9 which illustrate a vacuum assisted resin infusion system 28 that may be used to infuse and saturate a fiber preform 24 placed in the scarfed area 25 of the skin 22 during the rework process. As show in FIG. 7, a resin supply reservoir 54 supplies resin to the inlet 38a of a resin supply tube 38 overlying one or more layers 34, 36 of flow media 34, 36 placed over the fiber preform 24. The resin supply tube 38 may comprise a nylon spiral wrap such as that shown in FIGS. 8 and 9, which extends around the periphery of the fiber preform 24. The supply tube 38 may have other geometries, depending on the application and the shape of the fiber preform 24. Porous separation media 32, which may comprise, without limitation, a peel ply of fiberglass, is sandwiched between the fiber preform 24 and the flow media 34, 36 to facilitate separation of the flow media 34, 36 from the resin infused preform 24 following resin infusion and curing.

As shown in FIG. 7, a flexible vacuum bag 40 covers the stacked assembly of the resin supply tube 38, flow media 34, 36, separation media 32 and the fiber preform 24. The bag 40 is sealed at its outer periphery 40a to the outer side 22a of the skin 22 by means of sealant tape 42 or similar seal. The resin inlet 38a passes through the bag 40. A suitable vacuum source 41 is coupled with the vacuum bag 40 in order to draw a vacuum within the bag 40 that compresses the fiber preform 24 prior to and/or during resin infusion. The resin infusion system 28 described above may be similar to that shown in U.S. Pat. No. 7,334,782, issued Feb. 26, 2008, the entire disclosure of which is incorporated by reference herein. The above mentioned patent discloses a controlled atmospheric pressure resin infusion system in which the resin inlet reservoir 54 is evacuated to a pressure below atmospheric pressure, and is used in combination with cyclic compaction by the vacuum bag 40 to control a vacuum assisted resin transforming process. However, other resin infusion processes may be employed.

An excess resin vent tube 48 is sandwiched between two layers of flow media 50, 52 respectively, immediately beneath and generally aligned with the resin flow through hole 26. Porous separation media 46, which may comprise a layer of fiberglass, is disposed between the flow media 50, 52 and the inner side 22b of the skin 22. The outlet 48a of the vent tube 48 is coupled with a resin accumulation reservoir 57 which accumulates excess resin exiting the fiber preform 24 and flowing out through the hole 26 and into the vent tube 48. A vacuum bag 49 covers the vent tube, 48, flow media 50, 52 and separation media, and is sealed to the inner side 22b of the skin 22 by seals 56. The vent tube 48 may assist in controlling the resin flow wavefront and drawing resin into the bottom of the scarfed area 25 to achieve substantially even resin distribution throughout the fiber preform 24.

In use, the separation media 32, also known as a peel ply, along with flow media 34, 36 and resin inlet tube 38 are stacked on a fiber preform 24 that has been placed within the scarfed area 25. The vacuum bag 40 is then sealed to the outer side 22a of the skin 22 and coupled with both the vacuum source 41 and the resin supply reservoir 54. The vent tube 48 and flow media 50, 52 are assembled along with the separation media 46 on the inner side 22b of the skin 22, aligned with the flow hole 26. The bag 40 is evacuated to compact the fiber preform 24 as resin is supplied from the supply reservoir into the tube 38. The fiber preform 24 may be compacted prior to the start of resin infusion in order to increase the fiber-to-volume ratio resulting in higher fiber volumes that may provide the completed rework patch 24 with higher strength and/or less weight. The flow media 34, 36 distribute and flow the resin through the porous separation media into the fiber preform 24.

As previously noted, the fiber preform 24 may be cyclically compacted by varying the amount of pressure in the bag 40 using the vacuum source 41. The pressure in the resin supply reservoir 54 may be varied in relation to the pressure within the bag 40 in order to better control the net compaction pressure applied to the fiber preform 24 as the fiber preform 24 is being infused with resin. The size of the flow through hole 26 is chosen such that a preselected level of back pressure is created within the volume of the fiber preform 24. This back pressure helps assure within-tolerance impregnation of the fiber preform 24 with resin before exiting the perform 24 via the flow through hole 26 to the accumulation reservoir 57. When the preform 24 is nearly fully impregnated with resin, excess resin begins to flow through the hole 26 and is collected at the inner side 22b of the skin 22 by the flow media 50, and the resin vent tube 48. The amount of vacuum pressure within the bag 49 may be adjusted so as to induce flow of excess resin from the flow through hole 26 into the flow media 50, 52.

The vacuum applied to the bag 49 by the vacuum source 55 may assist in drawing the excess resin into the vent tube 48 and through the outlet 48a to the accumulation reservoir 57. The vacuum applied to the bag 49 may also help control the resin wavefront and resin distribution through the fiber preform 24. It may be possible to reduce the pressure within the reservoir 57 to aid in drawing resin through the outlet 48a into the reservoir 57. By creating a flow of excess resin through the hole 26, the preform 24 may be more fully infused with resin and any air entrapments within the preform 24 may be reduced or eliminated by being expelled through the hole 26. The flow of excess resin through the hole 26 may also aid in removing gases from the fiber preform 24 during the resin infusion process.

Figure 10:
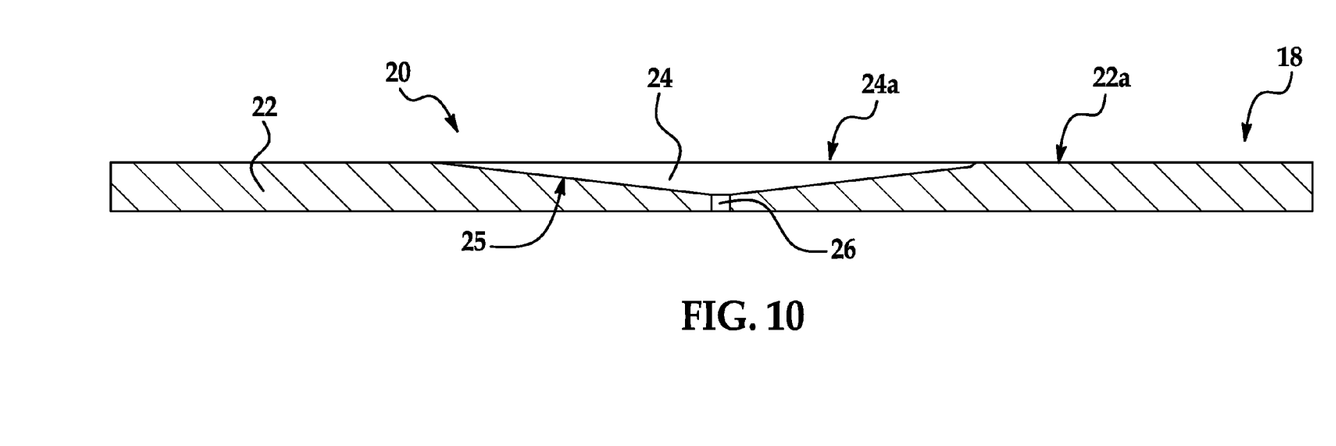
FIG. 10 is an illustration of a cross sectional view taken along the line 10-10 in FIG. 2.

Referring to FIG. 10 following curing of the resin infused and compacted fiber preform 24, the resin infusion assembly 28 may be removed. The through hole 26 is plugged with resin that remains within the hole 26 following the infusion process. In some applications, one or more plies (not shown) may be applied to the skin 24, covering and overlapping the rework patch 24, to provide a surface for smoothing and sanding prior to painting the skin 22 in the area 20 (FIG. 2) of the rework patch 24.

Figure 11:
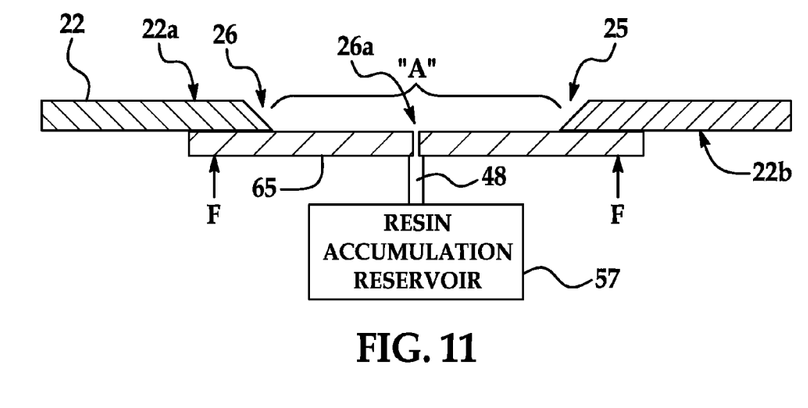
FIG. 11 is an illustration of a cross sectional view similar to FIG. 5, but showing an alternate embodiment of the apparatus.

Referring now to FIG. 11, in some applications of the disclosed method, the scarfed area 25 may extend to the inner side 22b of the skin 22 across a relatively wide area "A", forming a flow through hole 26 through the skin 22, similar to the embodiment shown in FIG. 6. In this event, a backing plate 65 having one or more secondary flow through holes 26a may be positioned against the inner side 22b of the skin 22, beneath the scarfed area 25. The backing plate 65 may be held against the skin 22 by an applied force "F" and sealed to the skin 22 using a suitable sealant (not shown). The force "F" may be applied by any suitable mechanical means (not shown) or by a vacuum bag (not shown) placed over the backing plate 65 and sealed to the inner side 22b of the skin 22. For example and without limitation, the backing plate 65 may be held against the inner skin surface 22b by the vacuum bag 49 shown in FIG. 9. A resin outlet tube 48 is coupled between the secondary flow through hole 26a in the plate 65 and a resin accumulation reservoir 57.

Figure 12:
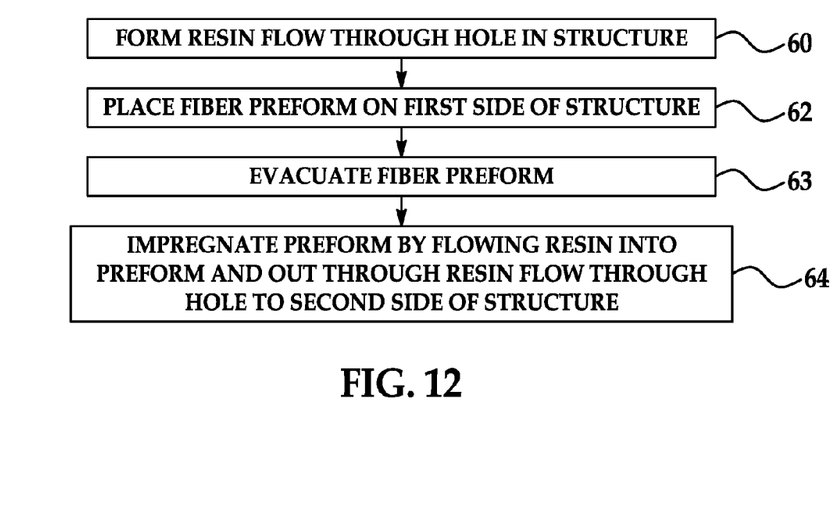
FIG. 12 is an illustration of a flow diagram of a method of reworking a structure using the disclosed method.

Attention is now directed to FIG. 12 which illustrates the overall steps of a method for reworking a localized area 20 of a structure 18. Beginning at 60, a flow of resin is established through a hole 26 in the structure 18 within the localized 20 area being reworked. At 62, a fiber preform 24 is placed on a first side 22a of the structure, overlying the hole 24, and at 63, the fiber preform 24 is evacuated. At 64, the preform 24 is impregnated by flowing resin into the preform 24 and out through the resin flow through hole 26 to a second side 22b of the structure 18.

Figure 13:
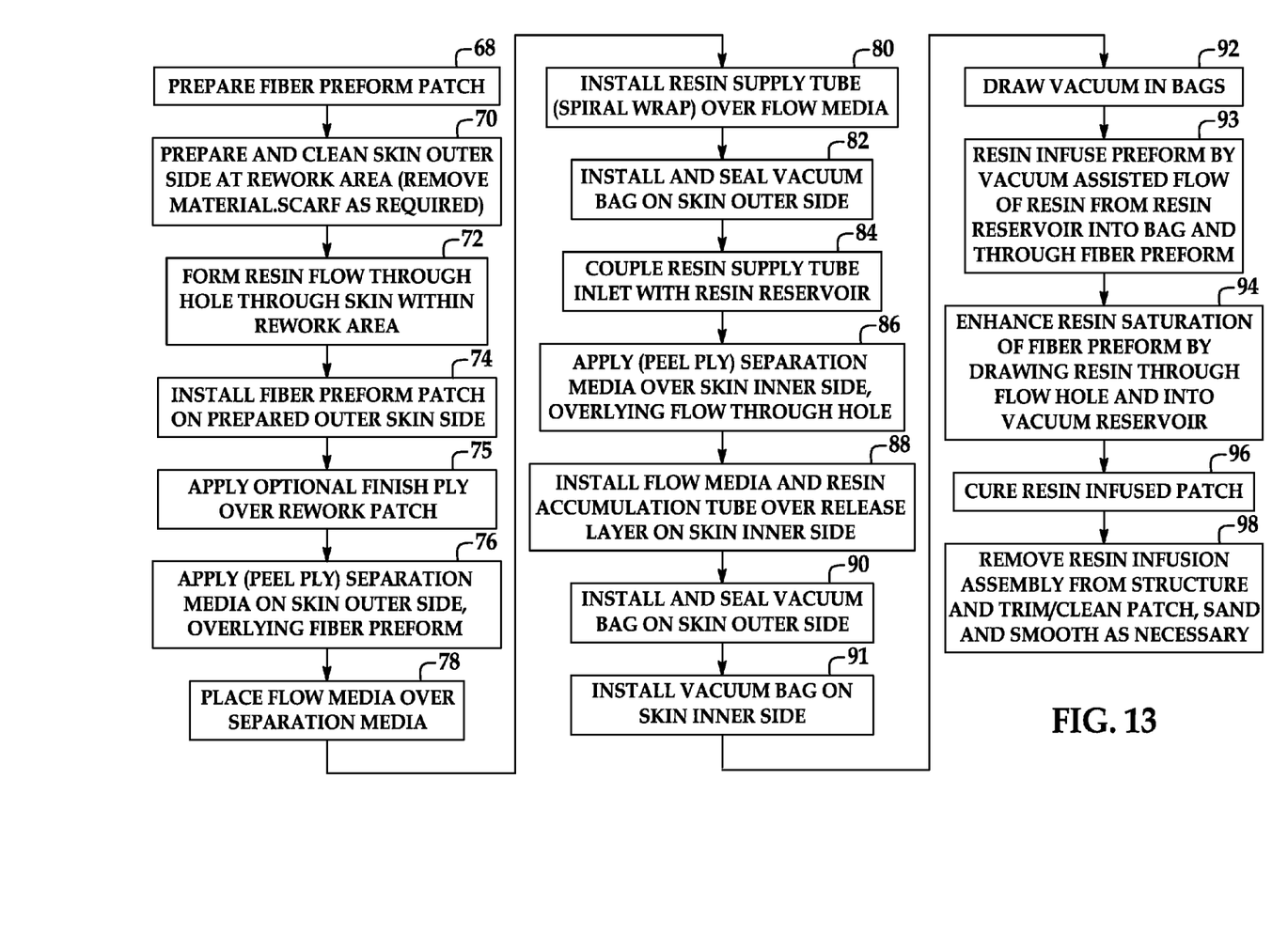
FIG. 13 is an illustration of a flow diagram showing additional details of the method shown in FIG. 12.

FIG. 13 illustrates additional details of the disclosed method. Beginning at 68, a fiber preform patch 24 is prepared which may comprise laying up multiple plies (not shown) of a dry fiber reinforcement such as a woven or knitted fabric. These layers of preform fiber may be sized and shaped to substantially fit the scarfed area 25 in the structure 18. At step 70, the skin outer side 22a within the rework area 20 is prepared and cleaned, as required. Step 70 may include scarfing a portion 27 (FIG. 3) of the skin 22 that includes the inconsistency. At step 72, a resin flow through hole 26 is formed through the skin 22 within the rework area 20. At 74, the fiber preform patch 24 is installed on the outer side 22a of the skin 22 within the scarfed area 25. An optional finish ply may be placed over the fiber preform 24, as shown at step 75. At 76, separation media (peel ply) is placed on the skin outer side 22a, overlying the fiber preform 24.

At step 78, one or more layers of flow media 34, 36 are placed over the release media 32, and at step 80, a resin supply tube 38, which may comprise a spiral wrap, is placed on the flow media 34, 36. At step 82, a vacuum bag is installed and sealed to the outer side 22a of the skin 22. At 84, the resin supply tube 38 is coupled with a suitable reservoir 54 of resin. At 86, separation media 46 (peel ply) is placed over the skin inner side 22b, overlying the flow through hole 26. At 88, flow media 50, 52 and a resin vent tube 48 are installed between the flow media 50, 52. At step 90, a vacuum bag 49 is installed and sealed to the skin outer side 22a, and at step 91, a vacuum bag 49 is installed and sealed to the skin inner side 22b.

At step 92, vacuums are drawn in the bags 40, 49, and at step 93, the fiber preform 24 is infused with resin by the vacuum assisted flow of resin from the resin reservoir 54 into bag 40 and through the preform 24, due the pressure differential that exists between the resin inlet 38a and the resin vent outlet tube 48a. At 94, resin saturation of a fiber preform 24 is enhanced and air entrapment is substantially eliminated by drawing resin through the flow hole 26 and into the accumulation reservoir 57. At step 96, the resin infused preform 24 is cured and at step 98, the resin infusion assembly 28 may be removed from the skin 22, and the cured patch 24 may then be cleaned and trimmed, as necessary.

Figure 14:
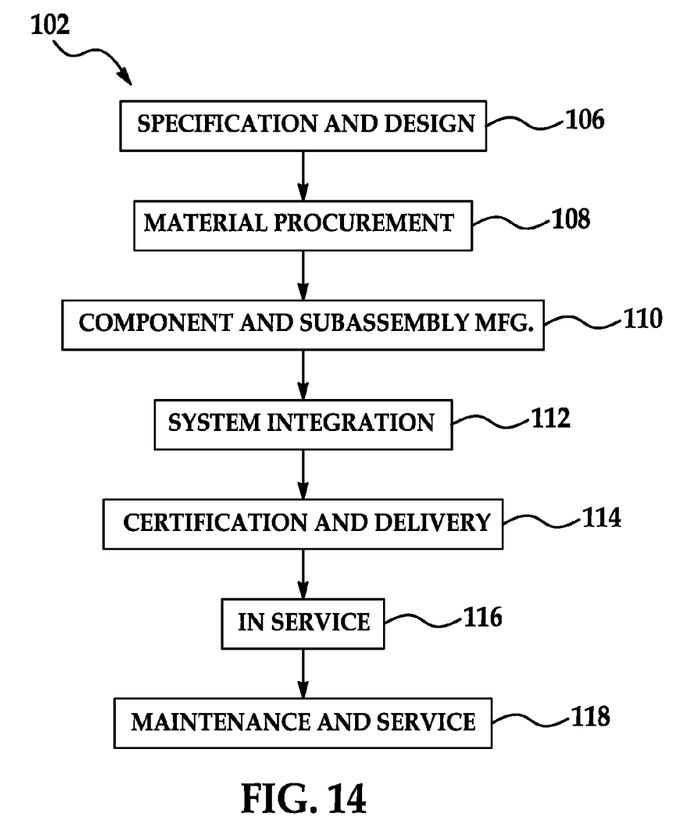
FIG. 14 is an illustration of a flow diagram of aircraft production and service methodology.
Figure 15:
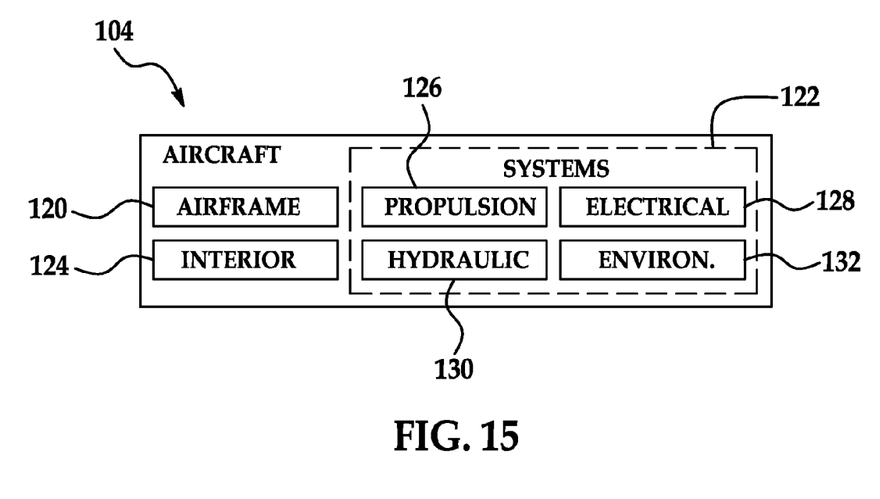
FIG. 15 is an illustration of a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 102 as shown in FIG. 14 and an aircraft 104 as shown in FIG. 15. Aircraft applications of the disclosed embodiments may include a wide variety of structural composite parts and components, including for example and without limitation, control surface skins, wing and empennage skins, and access doors and panels, to name only a few. During pre-production, exemplary method 102 may include specification and design 106 of the aircraft 104 and material procurement 108. During production, component and subassembly manufacturing 110 and system integration 112 of the aircraft 104 takes place. Thereafter, the aircraft 104 may go through certification and delivery 114 in order to be placed in service 116. While in service by a customer, the aircraft 114 is scheduled for routine maintenance and service 118 (which may also include modification, reconfiguration, refurbishment, and so on). The disclosed method may be employed during any one or more of stages 110, 112, 116 or 118 to rework areas of parts, components or assemblies.

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 114 produced by exemplary method 102 may include an airframe 120 with a plurality of systems 122 and an interior 124. Examples of high-level systems 122 include one or more of a propulsion system 126, an electrical system 128, a hydraulic system 130, and an environmental system 132. Any number of other systems may be included. The disclosed method may be employed to rework areas of various parts and components used in the airframe 120. Although an aerospace example is shown, the principles of the disclosure may be applied to other industries, such as the marine and automotive industries.

Systems and methods embodied herein may be employed during any one or more of the stages of the production and service method 102. For example, parts, structures and components corresponding to production process 110 may be reworked in a manner similar to rework of parts, structures and components while the aircraft 104 is in service. Also the disclosed method embodiments may be utilized during the production stages 110 and 112, for example, by substantially expediting assembly of or reducing the cost of an aircraft 104. Similarly, one or more of method embodiments may be utilized to rework parts while the aircraft 132 is in service, for example and without limitation, as part of maintenance and service 146.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of reworking an area, known as a rework area, of a structure having a first side and a second side, comprising:
   forming a resin flow hole through the structure in the rework area, from the first side of the structure to the second side of the structure;
   placing a fiber preform on the first side of the structure, the fiber preform comprising multiple plies;
   placing a vacuum bag over the fiber preform;
   sealing the vacuum bag to the first side of the structure around the fiber preform;
   flowing resin into the preform;
   drawing a vacuum in the bag to apply compaction pressure to the fiber preform;
   impregnating the fiber preform with resin by using the compaction pressure to drive the resin through the preform and into the resin flow hole to the second side of the structure; and
   controlling a resin flow wavefront by flowing resin through the preform and into the resin flow hole.

2. The method of claim 1, further comprising:
   forming a depression in the first side of the structure within the rework area by removing undesired material from the structure to accommodate the fiber preform, and
   wherein placing the fiber preform on the first side includes placing the fiber preform in the depression.

3. The method of claim 2, wherein forming the resin flow hole is performed by removing material from the structure during forming of the depression to a depth that penetrates the second side of the structure.

4. The method of claim 1, wherein forming the resin flow hole includes drilling a hole through the structure from the first side of the structure to the second side of the structure within the rework area.

5. The method of claim 2, wherein removing a portion of the first side of the structure includes forming a scarf in the first side substantially matching a profile of the fiber preform.

6. The method of claim 1, further comprising:
   placing a vacuum bag over the fiber preform;
   sealing the vacuum bag to the first side of the structure;
   drawing a vacuum in the vacuum bag;
   coupling the vacuum bag with a reservoir of resin;
   reducing pressure on resin in the resin reservoir to a value less than atmospheric pressure; and
   supplying resin into the vacuum bag at a pressure that is less than the atmospheric pressure.

7. A method of reworking an area of a composite structure, comprising:
   scarfing the area of a first side of the structure to create a scarfed area;
   forming a hole in the structure within the scarfed area;
   placing a fiber preform in the scarfed area overlying the hole, the fiber preform comprising multiple plies;
   placing resin flow media over the fiber preform;
   placing a first vacuum bag over the resin flow media and the fiber preform;
   sealing the first vacuum bag to the first side of the structure;
   coupling the first vacuum bag with a source of resin;
   drawing a vacuum in the first vacuum bag to apply compaction pressure to the fiber preform;
   impregnating the fiber preform with resin by using the compaction pressure to drive resin into the fiber preform to create a resin infused fiber preform;
   compacting the fiber preform; and
   allowing some of the resin flowing into the fiber preform to escape the scarfed area by flowing through the hole.

8. The method of claim 7, further comprising:
   coupling the hole with an excess resin reservoir where excess resin flowing through the hole may accumulate.

9. The method of claim 8, further comprising:
   reducing a pressure within the excess resin reservoir to a value that is less than atmospheric pressure.

10. The method of claim 7, further comprising:
    placing the resin flow media on a second side of the structure overlying the hole;
    placing a second vacuum bag over the resin flow media on the second side of the structure;
    sealing the second vacuum bag to the second side of the structure; and
    drawing a second vacuum in the second bag.

11. The method of claim 10, further comprising:
placing the resin flow media on the second side of the structure and in flow communication with the hole;
coupling a resin outlet with the resin flow media on the second side of the structure; and
using the resin flow media to collect excess resin exiting the hole and direct the excess resin into the resin outlet.

12. The method of claim 11, further comprising:
delivering the excess resin from the resin outlet to a resin accumulation reservoir.

13. The method of claim 11, further comprising:
reducing a pressure of the excess resin flowing through the hole to the resin outlet.

14. The method of claim 11, further comprising:
curing the resin infused fiber preform.

15. A method of reworking an area of aircraft skin, comprising:
preparing an outer side of the skin within a rework area to receive a fiber preform, resulting in a prepared outer side;
creating a hole in the skin passing from the outer side to an inner side of the skin within the rework area;
placing the fiber preform on the prepared outer side of the skin, the fiber preform comprising multiple plies;
placing a vacuum bag over the fiber preform;
sealing the vacuum bag to the first side of the structure around the fiber preform;
flowing resin into the preform;
drawing a vacuum in the bag to apply compaction pressure to the fiber preform;
infusing the fiber preform with resin by using the compaction pressure to drive the resin into the fiber preform from the outer side of the skin and flowing the resin through the hole to the inner side of the skin; and
compacting the fiber preform.

16. The method of claim 15, wherein:
preparing the outer side of the skin includes scarfing a portion of the skin to substantially match a profile of the fiber preform, resulting in a scarfed portion;
creating the hole in the skin includes drilling through the skin within the scarfed portion; and
placing the fiber preform in the prepared outer side of the skin includes positioning the fiber preform over the hole.

17. The method of claim 15, further comprising:
placing resin flow media over the fiber preform;
placing a vacuum bag over the fiber preform and the resin flow media;
sealing the bag to the outer side of the skin to form a vacuum tight enclosure over the fiber preform; and
wherein compacting the fiber preform includes evacuating the vacuum bag and infusing the fiber preform includes flowing the resin into the vacuum bag at a pressure that is less than atmospheric pressure.

18. The method of claim 17, further comprising placing the resin flow media on the inner side of the skin covering the hole;
coupling a resin exit tube with the resin flow media on the inner side of the skin; and
accumulating excess resin by drawing the resin from the resin exit tube to a reservoir.

19. A method of reworking an area of an aircraft skin known as a rework area, comprising:
scarfing a portion of an outer side of the aircraft skin within the area being reworked to form a scarfed portion;
forming a fiber preform substantially in a shape of the scarfed portion;
placing the fiber preform in the scarfed portion on the outer side of the aircraft skin;
placing a porous separation media over the fiber preform on the outer side of the aircraft skin;
placing a resin flow media over the porous separation media;
placing a resin supply tube over the resin flow media;
placing a vacuum bag over the fiber preform, the resin flow media and the resin supply tube;
sealing the vacuum bag to the outer side of the aircraft skin;
coupling a vacuum source with the vacuum bag;
drawing a vacuum in the vacuum bag;
flowing resin from a resin reservoir through the vacuum bag and into the resin supply tube;
using the resin flow media to flow resin through the fiber preform;
forming a resin flow through a hole in the aircraft skin within the rework area;
saturating the fiber preform and substantially reducing air entrapment in the fiber preform by flowing resin from the fiber preform though the hole; and
coupling a vent tube between the hole and a resin accumulation reservoir to accumulate excess resin flowing from the fiber preform.

* * * * *